United States Patent
Inoue et al.

(10) Patent No.: US 9,831,771 B2
(45) Date of Patent: Nov. 28, 2017

(54) CIRCUIT DEVICE AND ELECTRONIC APPARATUS

(71) Applicant: SEIKO EPSON CORPORATION, Tokyo (JP)

(72) Inventors: Katsumi Inoue, Shiojiri (JP); Atsushi Yamada, Nagoya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 76 days.

(21) Appl. No.: 14/606,373

(22) Filed: Jan. 27, 2015

(65) Prior Publication Data

US 2015/0236592 A1   Aug. 20, 2015

(30) Foreign Application Priority Data

Feb. 18, 2014 (JP) ................................. 2014-028249

(51) Int. Cl.
| | |
|---|---|
| G05D 23/275 | (2006.01) |
| H02M 3/158 | (2006.01) |
| H02P 7/29 | (2016.01) |
| H02P 29/68 | (2016.01) |
| H02M 1/32 | (2007.01) |

(52) U.S. Cl.
CPC ............ *H02M 3/158* (2013.01); *H02P 7/29* (2013.01); *H02P 29/68* (2016.02); *H02M 2001/327* (2013.01)

(58) Field of Classification Search
USPC ..... 318/634, 400.21, 400.22, 782, 783, 641, 318/400.08, 788, 792, 434; 324/750.03, 324/750.06
See application file for complete search history.

(56) References Cited

U.S. PATENT DOCUMENTS

| | | | | |
|---|---|---|---|---|
| 5,063,307 A | * | 11/1991 | Zommer ............ | H01L 27/0248 257/467 |
| 5,543,632 A | * | 8/1996 | Ashley ............... | H01L 27/0248 257/341 |
| 5,894,394 A | * | 4/1999 | Baba ..................... | H02H 1/043 361/100 |
| 6,608,791 B2 | * | 8/2003 | Watanabe ................ | G11C 5/14 365/189.09 |
| 7,843,675 B2 | * | 11/2010 | Hirata .................... | H02H 3/093 361/18 |
| 8,384,395 B2 | * | 2/2013 | Karnad ............. | G01R 31/2875 324/555 |

(Continued)

FOREIGN PATENT DOCUMENTS

| | | | |
|---|---|---|---|
| JP | 2002026707 A | * | 1/2002 |
| JP | 2008-042975 A | | 2/2008 |
| JP | 2010-012873 A | | 1/2010 |

*Primary Examiner* — Jorge L Carrasquillo
(74) *Attorney, Agent, or Firm* — Oliff PLC

(57) ABSTRACT

Provided is a circuit device in which reduction of power consumption, reduction of the number of parts, and the like can be realized by eliminating the need for a sense resistor. The circuit device includes a bridge circuit, and a control circuit configured to compare a reference voltage VR and a detection voltage V2 (V1) set using the on-current and the on-resistance of at least one of a low-side transistor and a high-side transistor, output a detection result, control switching on and off of transistors in the bridge circuit, and perform switching from a charge period to a decay period.

14 Claims, 11 Drawing Sheets

(56) References Cited

U.S. PATENT DOCUMENTS

| | | | |
|---|---|---|---|
| 9,331,616 B2* | 5/2016 | Swanson | |
| 2003/0001531 A1* | 1/2003 | Xi | H02P 6/28 |
| | | | 318/400.22 |
| 2008/0231246 A1* | 9/2008 | Sugie | G11B 19/28 |
| | | | 323/284 |
| 2008/0284500 A1* | 11/2008 | Chigira | H02P 8/22 |
| | | | 327/538 |
| 2009/0039869 A1* | 2/2009 | Williams | H01L 23/49575 |
| | | | 324/123 R |
| 2010/0085025 A1* | 4/2010 | Kato | H02M 3/157 |
| | | | 323/282 |
| 2011/0181263 A1* | 7/2011 | Maruyama | H03K 17/0828 |
| | | | 323/284 |
| 2011/0298443 A1* | 12/2011 | Kanemitsu | H03K 17/0822 |
| | | | 323/299 |
| 2012/0126791 A1* | 5/2012 | Nakatake | H03K 17/0822 |
| | | | 324/123 R |
| 2014/0145666 A1* | 5/2014 | Swanson | E05B 81/06 |
| | | | 318/504 |
| 2015/0236592 A1* | 8/2015 | Inoue | H02M 3/158 |
| | | | 318/445 |

* cited by examiner

| RON[Ω] | DAC setting | | | | |
|---|---|---|---|---|---|
| | 1 50mA | 2 100mA | ..... | 14 700mA | 15 750mA |
| 0.70 | 0.035 | 0.070 | ..... | 0.496 | 0.525 |
| 0.75 | 0.038 | 0.075 | ..... | 0.525 | 0.563 |
| 0.80 | 0.040 | 0.080 | ..... | 0.560 | 0.600 |
| 0.85 | 0.043 | 0.085 | ..... | 0.595 | 0.638 |
| 0.90 | 0.045 | 0.090 | ..... | 0.630 | 0.675 |
| 0.95 | 0.048 | 0.095 | ..... | 0.665 | 0.713 |
| 1.00 | 0.050 | 0.100 | ..... | 0.700 | 0.750 |
| 1.05 | 0.053 | 0.105 | ..... | 0.735 | 0.788 |
| 1.10 | 0.055 | 0.110 | ..... | 0.770 | 0.825 |
| 1.15 | 0.058 | 0.115 | ..... | 0.805 | 0.863 |
| 1.20 | 0.060 | 0.120 | ..... | 0.840 | 0.900 |

| DT[V] | Temperature [°C] | DAC setting | | | | |
|---|---|---|---|---|---|---|
| | | 1 | 2 | ..... | 14 | 15 |
| | | 50mA | 100mA | ..... | 700mA | 750mA |
| 1.490 | −25 | 72.5% | 72.5% | 72.5% | 72.5% | 72.5% |
| 1.474 | −20 | 70.9% | 70.9% | 70.9% | 70.9% | 70.9% |
| 1.453 | −15 | 74.6% | 74.6% | 74.6% | 74.6% | 74.6% |
| 1.432 | −10 | 78.2% | 78.2% | 78.2% | 78.2% | 78.2% |
| 1.411 | −5 | 81.9% | 81.9% | 81.9% | 81.9% | 81.9% |
| 1.391 | 0 | 85.5% | 85.5% | 85.5% | 85.5% | 85.5% |
| 1.370 | 5 | 89.2% | 89.2% | 89.2% | 89.2% | 89.2% |
| 1.349 | 10 | 92.8% | 92.8% | 92.8% | 92.8% | 92.8% |
| 1.328 | 15 | 96.5% | 96.5% | 96.5% | 96.5% | 96.5% |
| 1.308 | 20 | 99.9% | 99.9% | 99.9% | 99.9% | 99.9% |
| 1.288 | 25 | I050 | I100 | ..... | I700 | I750 |
| 1.266 | 30 | 107.4% | 107.4% | 107.4% | 107.4% | 107.4% |
| 1.245 | 35 | 111.1% | 111.1% | 111.1% | 111.1% | 111.1% |
| 1.224 | 40 | 114.7% | 114.7% | 114.7% | 114.7% | 114.7% |
| 1.204 | 45 | 118.4% | 118.4% | 118.4% | 118.4% | 118.4% |
| 1.183 | 50 | 122.0% | 122.0% | 122.0% | 122.0% | 122.0% |
| 1.162 | 55 | 125.7% | 125.7% | 125.7% | 125.7% | 125.7% |
| 1.141 | 60 | 129.4% | 129.4% | 129.4% | 129.4% | 129.4% |
| 1.120 | 65 | 133.0% | 133.0% | 133.0% | 133.0% | 133.0% |
| 1.100 | 70 | 136.7% | 136.7% | 136.7% | 136.7% | 136.7% |
| 1.079 | 75 | 140.3% | 140.3% | 140.3% | 140.3% | 140.3% |
| 1.058 | 80 | 144.0% | 144.0% | 144.0% | 144.0% | 144.0% |
| 1.042 | 85 | 140.9% | 140.9% | 140.9% | 140.9% | 140.9% |
| 1.017 | 90 | 151.3% | 151.3% | 151.3% | 151.3% | 151.3% |
| 0.996 | 95 | 154.9% | 154.9% | 154.9% | 154.9% | 154.9% |
| 0.977 | 100 | 158.6% | 158.6% | 158.6% | 158.6% | 158.6% |
| 0.954 | 105 | 162.2% | 162.2% | 162.2% | 162.2% | 162.2% |
| 0.933 | 110 | 165.9% | 165.9% | 165.9% | 165.9% | 165.9% |
| 0.913 | 115 | 169.5% | 169.5% | 169.5% | 169.5% | 169.5% |
| 0.892 | 120 | 173.2% | 173.2% | 173.2% | 173.2% | 173.2% |
| 0.874 | 125 | 176.8% | 176.8% | 176.8% | 176.8% | 176.8% |
| 0.850 | 130 | 180.5% | 180.5% | 180.5% | 180.5% | 180.5% |
| 0.829 | 135 | 184.1% | 184.1% | 184.1% | 184.1% | 184.1% |
| 0.809 | 140 | 187.8% | 187.8% | 187.8% | 187.8% | 187.8% |
| 0.788 | 145 | 191.4% | 191.4% | 191.4% | 191.4% | 191.4% |
| 0.765 | 150 | 200.4% | 200.4% | 200.4% | 200.4% | 200.4% |

FIG. 10

CIRCUIT DEVICE AND ELECTRONIC APPARATUS

CROSS REFERENCE

The entire disclose of Japanese Patent Application No. 2014-028249, filed Feb. 18, 2014, is expressly incorporated by reference herein.

BACKGROUND

1. Technical Field

The present invention relates to a circuit device and an electronic apparatus.

2. Related Art

A method of controlling driving of a motor by controlling a chopping current is known as a motor driver that drives a DC motor. With this method, current flowing in an H bridge circuit is subjected to current-to-voltage conversion using a sense resistor, the obtained voltage is compared with a reference voltage, and thereby the chopping current is detected. Then, a motor is caused to rotate at a constant speed by feeding the detection result back to the control circuit and subjecting the driving signal of the bridge circuit to PWM control. The techniques disclosed in JP-A-2008-42975 and JP-A-2010-12873 are known as examples of this kind of prior technique for a motor driver.

The bridge circuit of the motor driver has first to fourth transistors (switch elements) for driving, and the first and fourth transistors are electrically connected to the opposite ends of the motor and the second and third transistors are similarly connected to the motor. Also, in a charge period, the first and fourth transistors are on. This sets the positive terminal (+terminal) of the motor to a voltage with a high potential and sets the negative terminal (−terminal) to a voltage with a low potential. On the other hand, in a decay period, the second and third transistors are on. This sets the positive terminal of the motor to a voltage with a low potential and sets the negative terminal to a voltage with a high potential.

However, with prior motor drivers, a sense resistor for current detection is provided between the bridge circuit and a low-potential power supply (GND), monitors the voltage generated when the current flowing in the bridge circuit flows in the sense resistor, and thereby controls the switching on and off of the transistors in the bridge circuit. Accordingly, power is needlessly consumed by the sense resistor, which hampers reduction of power consumption. Also, since the sense resistor is provided as an external part of a circuit device (IC), the number of parts for the electronic apparatus in which the circuit device is incorporated increases, incurring problems such as an increase in cost.

According to some aspects of the invention, it is possible to provide a circuit device and an electronic apparatus in which reduction of power consumption, reduction of the number of parts, and the like can be realized by eliminating the need for a sense resistor.

SUMMARY

One aspect of the invention relates to a circuit device including: a bridge circuit that has a high-side transistor and a low-side transistor; a detection circuit configured to compare a reference voltage and a detection voltage set using an on-current and an on-resistance of at least one of the high-side transistor and the low-side transistor, and output a detection result; and a control circuit configured to perform control of switching on and off of the high-side transistor and the low-side transistor and perform switching from a charge period to a decay period based on the detection result of the detection circuit.

According to one aspect of the invention, a reference voltage and a detection voltage set using the on-current and the on-resistance of at least one of the low-side transistor and the high-side transistor are compared. Then, based on the detection result in the comparison, switching from a charge period to a decay period is performed. Thus, it is possible to execute switching from a charge period to a decay period even though a sense resistor is not provided, and it is therefore possible to realize reduction of power consumption, reduction of the number of parts, and the like by eliminating the need for the sense resistor.

Also, in one aspect of the invention, the reference voltage may have a second temperature characteristic that compensates for a first temperature characteristic of the detection voltage, and the detection circuit may compare the detection voltage and the reference voltage having the second temperature characteristic and output the detection result.

With this configuration, by giving the reference voltage a second temperature characteristic also in the case where the detection voltage has a first temperature characteristic according to the temperature characteristic of the on-resistance of the transistor, or the like, for example, temperature compensation for the first temperature characteristic is possible. Accordingly, even if the temperature changes, switching from the charge period to the decay period can be executed appropriately.

Also, according to one aspect of the invention, it is possible to include a temperature compensation circuit configured to set the temperature characteristic of the reference voltage to the second temperature characteristic based on a temperature detection result from a temperature detection unit.

With this configuration, the temperature is detected by the temperature detection unit, and based on the temperature detection result, the temperature characteristic of the reference voltage can be set to the second temperature characteristic.

Also, according to one aspect of the invention, the temperature detection unit may output, as the temperature detection result, a temperature detection voltage having a third temperature characteristic, and the temperature compensation circuit may perform correction processing for setting the temperature characteristic of the reference voltage to the second temperature characteristic, based on the temperature detection voltage having the third temperature characteristic.

With this configuration, the third temperature characteristic of the temperature detection voltage is converted and the like by the temperature compensation circuit, for example, and thereby the temperature characteristic of the reference voltage can be set to the second temperature characteristic.

Also, according to one aspect of the invention, an overheating protection circuit may be included which has the temperature detection unit and performs an overheating protection operation, and the temperature compensation circuit may set the temperature characteristic of the reference voltage to the second temperature characteristic based on the temperature detection result from the temperature detection unit of the overheating protection circuit.

With this configuration, the temperature detection unit provided in the overheating protection circuit can be used effectively to set the temperature characteristic of the reference voltage to the second temperature characteristic.

Also, according to one aspect of the invention, the detection circuit may include a D/A conversion circuit for variably setting a chopping current used in determination of switching from the charge period to the decay period, and the temperature compensation circuit may set the temperature characteristic of the reference voltage, which is the voltage output from the D/A conversion circuit, to the second temperature characteristic using the setting of the D/A conversion circuit.

With this configuration, the D/A conversion circuit for variably setting the charge current can be used effectively to set the temperature characteristic of the reference voltage to the second temperature characteristic.

Also, in one aspect of the invention, it is possible to include a storage unit configured to store correction data for setting the temperature characteristic of the reference voltage to the second temperature characteristic.

With this configuration, by storing the correction data in the storage unit, the correction data can be used to set the temperature characteristic of the reference voltage to the second temperature characteristic.

Also, according to one aspect of the invention, the first temperature characteristic and the second temperature characteristic may be positive temperature characteristics.

Also, according to one aspect of the invention, the detection circuit may compare a drain voltage of the low-side transistor, which is the detection voltage, and the reference voltage and output the detection result.

Also, according to one aspect of the invention, the detection circuit may compare a drain voltage of the high-side transistor, which is the detection voltage, and the reference voltage and output the detection result.

Also, according to one aspect of the invention, if the detection voltage exceeds the reference voltage, the control circuit may control switching on and off of the high-side transistor and the low-side transistor so that switching from the charge period to the decay period is performed.

Also, another aspect of the invention relates to an electronic apparatus including a circuit device according to any part of the foregoing description.

BRIEF DESCRIPTION OF THE DRAWINGS

The invention will be described with reference to the accompanying drawings, wherein like numbers reference like elements.

FIG. 9 shows an example of a correction table for setting DAC.

FIG. 10 shows an example of a correction table for setting DAC.

DESCRIPTION OF EXEMPLARY EMBODIMENTS

The following describes preferred embodiments of the invention in detail. It should be noted that the embodiment to be described hereinafter is not intended to unduly limit the scope of the invention defined by the appended claims and that the entire configuration to be described in the embodiment is not necessarily essential as the means for achieving the invention.

1. Circuit Configuration of Circuit Device

Figure 1:
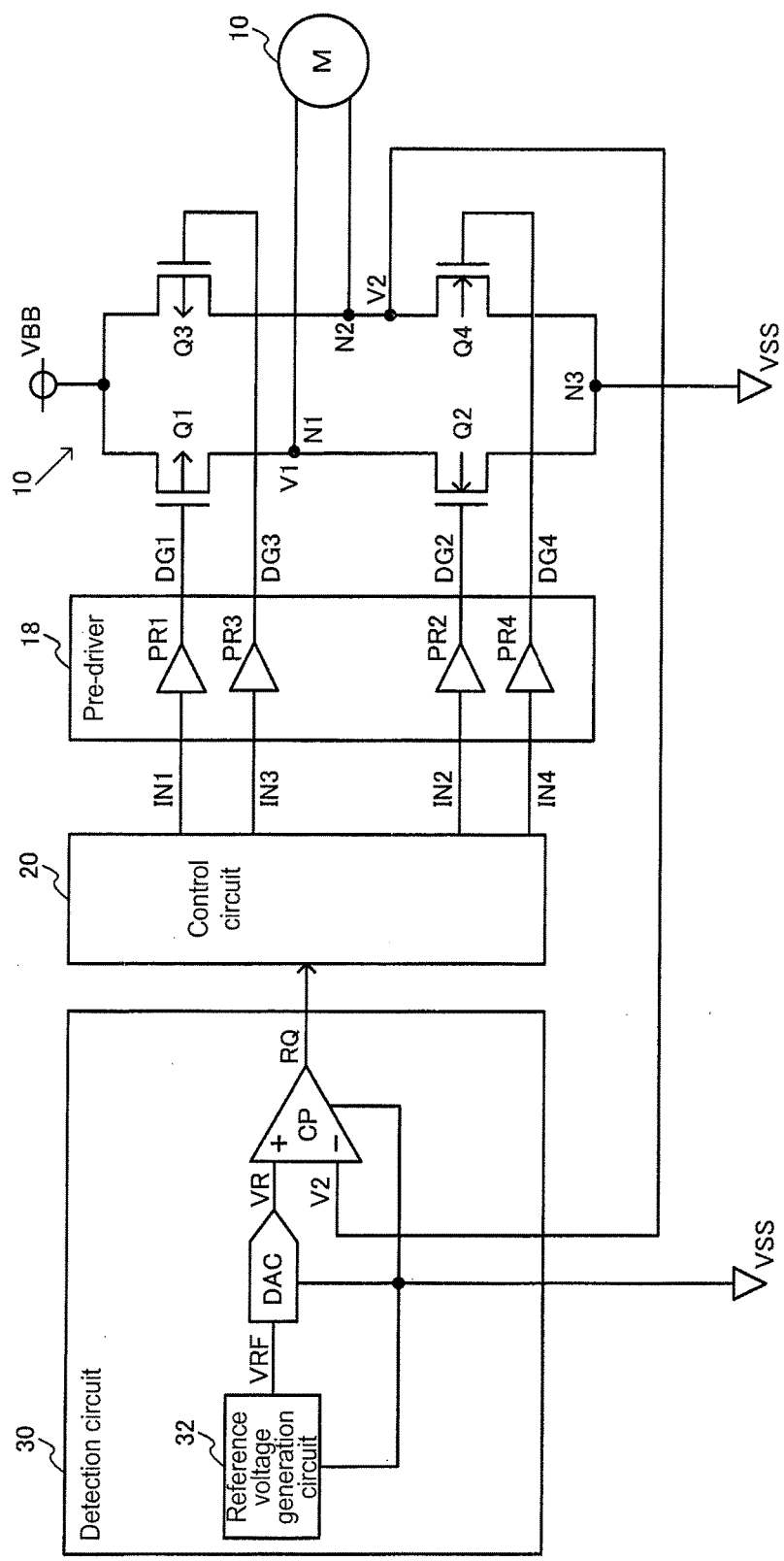
FIG. 1 shows an example of a configuration of a circuit device according to an embodiment.

FIG. 1 shows an example of a circuit configuration of a circuit device according to the present embodiment. The circuit device according to the present embodiment includes a bridge circuit 10, a control circuit 20, and a detection circuit 30. It can also include a pre-driver 18. Note that the circuit device according to the present embodiment is not limited to the configuration shown in FIG. 1 and is capable of being implemented with various modifications, such as removal of a portion of the constituent elements or addition of other constituent elements.

The bridge circuit 10 has high-side transistors Q1 and Q3 and low-side transistors Q2 and Q4. The bridge circuit 10 is a circuit that outputs a driving current to a motor 100 (e.g., a DC motor), and in FIG. 1, the bridge circuit 10 has an H-bridge circuit configuration. The high-side transistors Q1 and Q3 are p-type (to be broadly interpreted as "first conductivity type") transistors, for example, and the low-side transistors Q2 and Q4 are n-type (to be broadly interpreted as "second conductivity type") transistors, for example. The high-side transistors are the transistors that are connected closer to the high-potential power supply than the low-side transistors are. The low-side transistors are the transistors connected closer to the low-potential power supply than the high-side transistors are. Note that all of the transistors Q1, Q2, Q3, and Q4 may be n-type transistors. Also, body diodes (parasitic diodes) exist between the sources and drains of Q1, Q2, Q3, and Q4, although this is not shown in the figure.

The sources of the high-side transistors Q1 and Q3 are connected to the node of a power supply VBB (first power supply) on the high potential side. The sources of the low-side transistors Q2 and Q4 are connected to the node of a power supply VSS (GND) on the low potential side.

The drain of the transistor Q1 and the drain of the transistor Q2 are connected to a node N1 that is connected to one end of the motor 100 (to be broadly interpreted as "driving target"). The motor 100 is provided outside of the circuit device, for example, and the node N1 and one end of the motor 100 are electrically connected via a terminal (pad) of the circuit device (IC), for example.

The drain of the transistor Q3 and the drain of the transistor Q4 are connected to a node N2 that is connected to the other end of the motor 100. The node N2 and the other end of the motor 100 are electrically connected via a terminal (pad) of the circuit device, for example.

The detection circuit 30 detects current flowing in the bridge circuit 10 and outputs a detection result. For example, the detection circuit 30 outputs a detection result signal RQ to the control circuit 20 as the detection result.

The detection circuit 30 includes a reference voltage generation circuit 32, a D/A conversion circuit DAC, and a comparison circuit CP (comparator). The reference voltage generation circuit 32 generates a reference voltage VRF that is a constant voltage. The reference voltage generation circuit 32 is realized by a band gap reference circuit, or the like, for example.

The D/A conversion circuit DAC receives the reference voltage VRF and generates a reference voltage VR that changes variably based on setting data. Specifically, the D/A conversion circuit DAC changes the reference voltage VR in order to variably set the chopping current to be used in the determination of switching from the charge period to the decay period. A D/A conversion circuit using a ladder resistor circuit, or the like can be used as the D/A conversion circuit DAC.

The comparison circuit CP receives input of the reference voltage VR in a first input terminal (non-inverting input terminal), receives input of the detection voltage V2 in a second input terminal (inverting input terminal), and outputs the detection result signal RQ. For example, as will be described later, since the chopping current is determined using the reference voltage VR input to the comparison circuit CP, the torque and the like of the motor 100 can be controlled by changing the reference voltage VR using the D/A conversion circuit DAC.

Based on the detection result in the detection circuit 30, the control circuit 20 controls the switching on and off of the high-side transistors Q1 and Q3 and the low-side transistors Q2 and Q4. Specifically, based on the detection result signal RQ from the detection circuit 30, control signals IN1, IN2, IN3, and IN4, which are PWM signals, are generated. These control signals IN1, IN2, IN3, and IN4 control the length of the charge period.

The pre-driver 18 buffers the control signals IN1, IN2, IN3, and IN4 from the control circuit 20 and outputs driving signals DG1, DG2, DG3, and DG4 to the gates of the transistors Q1, Q2, Q3, and Q4. The pre-driver 18 has driver circuits PR1, PR2, PR3, and PR4 that buffer the control signals IN1, IN2, IN3, and IN4 and output the driving signals DG1, DG2, DG3, and DG4.

Also, in the present embodiment, the detection circuit 30 compares the reference voltage VR and the detection voltage V2 set by the on-current and on-resistance of at least one transistor among the high-side transistors (Q1 and Q3) and the low-side transistors (Q2 and Q4) and outputs the detection result.

For example, in FIG. 1, the detection voltage V2 is the drain voltage (voltage between the drain and source) of the low-side transistor Q4. For example, if ION4 is the on-current of the transistor Q4 and RON4 is the on-resistance at that time, the detection voltage V2 can be calculated as follows: V2=ION4×RON4. The detection circuit 30 compares the detection voltage V2 and the reference voltage VR and outputs the detection result signal RQ, which is the detection result, to the control circuit 20. Note that the detection voltage may be the drain voltage of the low-side transistor Q2.

Also, in a later-described modified example shown in FIG. 11, the drain voltage (voltage between the drain and source) of the high-side transistor Q1 is the detection voltage V1. For example, if ION1 is the on-current of the transistor Q1 and RON1 is the on-resistance at that time, the detection voltage V1 can be expressed as: V1=VBB−ION1×RON1. The detection circuit 30 compares the detection voltage V1 and the reference voltage VR and outputs the detection result. Note that the detection voltage may be the drain voltage of the high-side transistor Q1.

Also, the control circuit 20 controls the switching on and off of the high-side transistors Q1 and Q3 and the low-side transistors Q2 and Q4, and based on the detection result in the detection circuit 30, performs switching from the charge period to the decay period.

For example, by determining whether or not the detection voltage V2, which is the drain voltage of the low-side transistor Q4, is greater than the reference voltage VR, the detection circuit 30 detects whether or not the current flowing in the bridge circuit 10 has reached the chopping current. Also, if the detection voltage V2 is greater than the reference voltage VR and the current flowing in the bridge circuit 10 has reached the chopping current, the detection result signal RQ is made active. Accordingly, after receiving the detection result signal RQ, the control circuit 20 controls the switching on and off of the high-side transistors Q1 and Q3 and the low-side transistors Q2 and Q4 so that switching from the charge period to the decay period is performed. Thus, in the present embodiment, if the detection voltage V2 is greater than the reference voltage VR, the control circuit 20 controls the switching on and off of the high-side transistors Q1 and Q3 and the low-side transistors Q2 and Q4 so that switching from the charge period to the decay period is performed.

In this case, it is preferable that the reference voltage VR has a second temperature characteristic that compensates for a first temperature characteristic of the detection voltage V2. Also, the detection circuit 30 compares the detection voltage V2 and the reference voltage VR having the second temperature characteristic and outputs the detection result. Here, the first temperature characteristic of the detection voltage V2 and the second temperature characteristic of the reference voltage VR are both positive temperature characteristics, for example.

For example, in FIG. 1, the detection voltage V2 is the drain voltage (voltage between the drain and source) of the low-side transistor Q4, and therefore is proportional to the on-resistance RON4 of the transistor Q4. Also, since the on-resistance RON4 has a positive temperature characteristic, the first temperature characteristic of the detection voltage V2 is also a positive temperature characteristic. That is to say, as the temperature increases, the detection voltage V2 also increases.

In view of this, in the present embodiment, the reference voltage VR is set to a positive second temperature characteristic that compensates for the positive first temperature characteristic of the detection voltage V2. For example, if the temperature rises and the detection voltage V2 rises, the reference voltage VR is also caused to rise in accordance therewith. By doing so, even if the temperature changes, it is possible to keep the chopping current for the time of switching from the charge period to the decay period constant (roughly constant).

The temperature compensation circuit 50 of later-described FIG. 5 can realize the second temperature characteristic of the reference voltage VR in this case by setting the D/A conversion circuit DAC. For example, the temperature compensation circuit 50 sets the D/A conversion circuit DAC based on correction data so that the reference voltage output by the D/A conversion circuit DAC increases as the temperature rises. Alternatively, the reference voltage generation circuit 32 may generate and output the reference voltage VRF with a temperature characteristic corresponding to the second temperature characteristic, for example. In other words, a reference voltage VRF with a temperature characteristic according to which the temperature characteristic of the detection voltage V2 is compensated for is generated. Specifically, the reference voltage generation circuit 32 generates a reference voltage VRF that increases as the temperature rises. By doing so, the reference voltage VR output by the D/A conversion circuit DAC also increases as the temperature rises, and the temperature characteristic of the detection voltage V2 can be compensated for (canceled out).

Next, operations of the bridge circuit 10 of the circuit device according to the present embodiment will be described with reference to FIGS. 2A and 2B.

Figure 2A:
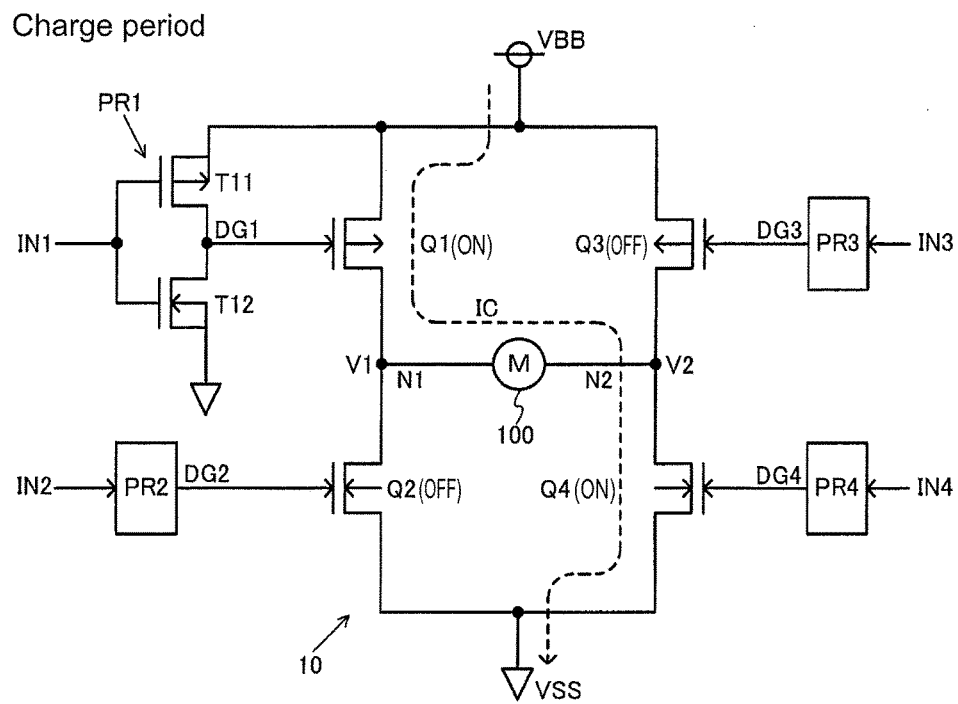
FIGS. 2A and 2B are diagrams for describing operations of a bridge circuit.

As shown in FIG. 2A, the transistors Q1 and Q4 are on in the charge period. Accordingly, a charge current IC flows from the high-potential side power supply VBB to the low-potential side power supply VSS (GND) via the transistor Q1, the motor 100 (motor coil), and the transistor Q4.

Figure 2B:
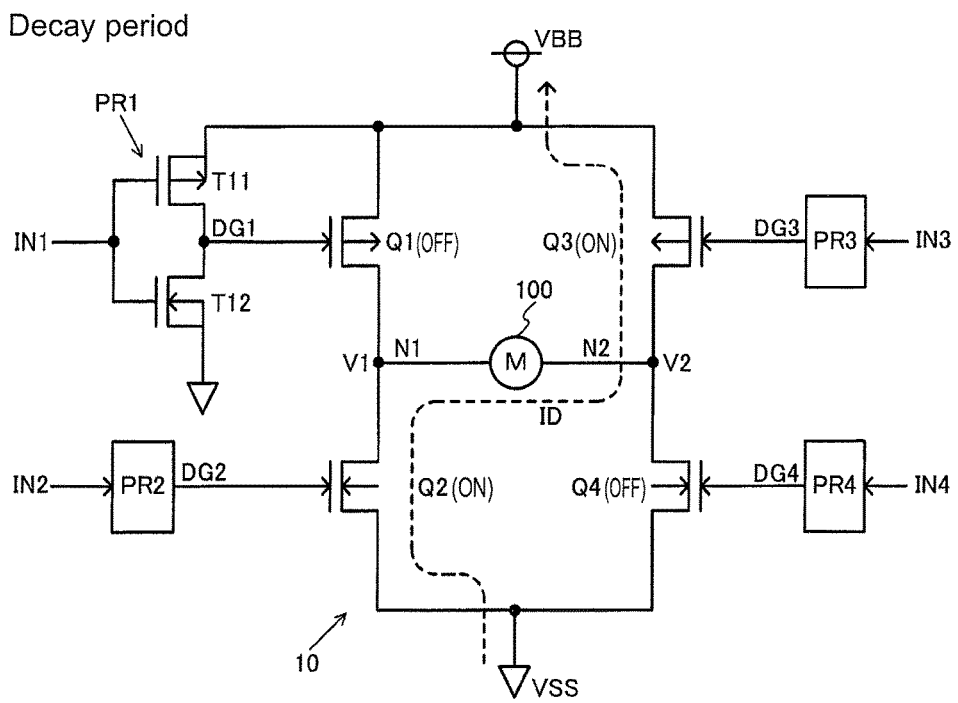

On the other hand, in the decay period, as shown in FIG. 2B, the transistors Q2 and Q3 are on, and a decay current ID flows from the power supply VSS to the power supply VBB via the transistor Q2, the motor 100, and the transistor Q3. Both the charge current IC and the decay current ID flow from the positive terminal to the negative terminal of the motor 100.

Figure 3:
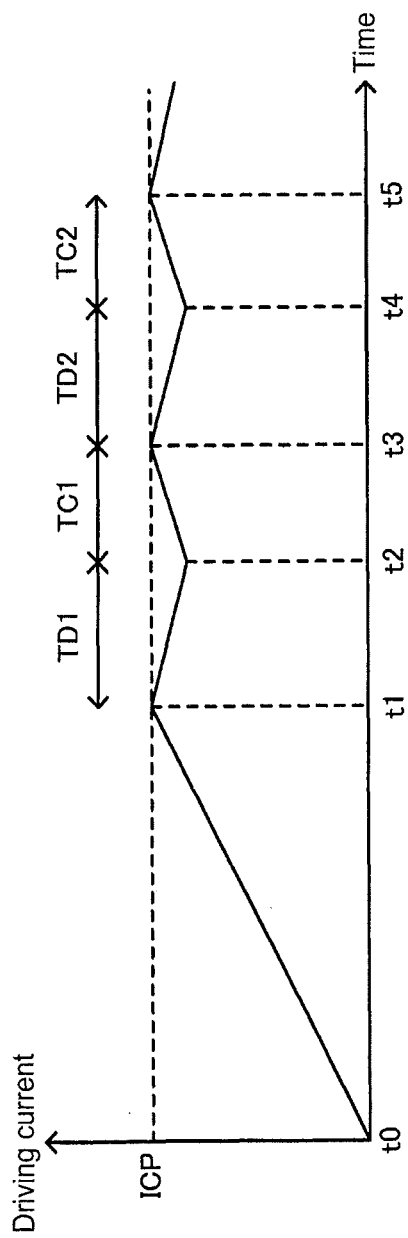
FIG. 3 is a diagram for describing a method for controlling a chopping operation.

Also, as shown in FIG. 1, the voltage at the drain node of the transistor Q4 is input to the detection circuit 30 as the detection voltage V2. Then, the comparison circuit CP compares the detection voltage V2 and the reference voltage VR. Also, as shown in FIG. 3, the control circuit 20 performs control of a chopping operation for keeping the chopping current ICP that flows in the bridge circuit 10 constant. Specifically, the control circuit 20 controls the pulse width of the PWM signals (IN1 to IN4) so that the chopping current ICP is constant, and the switching on and off of the transistors Q1 to Q4 are controlled based on the PWM signals.

For example, when the driving of the motor 100 is started at time t0 in FIG. 3, the charge period shown in FIG. 2A is started, the transistors Q1 and Q4 are switched on, and the transistors Q2 and Q3 are switched off. Accordingly, the driving current (charge current IC) flows from the power supply VBB to the power supply VSS via the transistor Q1, the motor 100, and the transistor Q4. Also, at time t1, when the driving current of the motor 100 reaches the chopping current ICP, switching to the decay period TD1 is performed. Specifically, if the driving current increases and the detection voltage V2 exceeds the reference voltage VR, the comparison result signal RQ of the comparison circuit CP will switch from low-level to high-level, and switching to the decay period TD1 will be performed at time t1. The driving current of the motor 100 at time t1 is the chopping current ICP, and the chopping current ICP is detected with the detection of the detection voltage V2.

Upon switching to the decay period TD1, as shown in FIG. 2B, the transistors Q2 and Q3 switch on, and the transistors Q1 and Q4 switch off. Accordingly, the driving current (decay current ID) flows from the power supply VSS to the power supply VBB via the transistor Q2, the motor 100, and the transistor Q3. In the decay period TD1, as shown in FIG. 3, the driving current of the motor 100 decreases as time elapses.

Then, using a timer (counter circuit) or the like for example, the control circuit 20 detects that a predetermined amount of time has elapsed since the start of the decay period TD1, and switching from the decay period TD1 to the charge period TC1 is performed. In the charge period TC1, when the driving current of the motor 100 increases and reaches the chopping current ICP, switching to the decay period TD2 is performed once again. Thereafter, by repeating this process, control is performed according to which the chopping current ICP, which is the peak current of the driving current, is constant, and the rotation speed of the motor 100 is kept constant.

Note that a case in which the bridge circuit 10 is an H-bridge type was described above, but the present embodiment is not limited thereto, and the bridge circuit 10 may be a half-bridge type. In this case, in the bridge circuit 10, the transistors Q3 and Q4 are not provided, and the transistors Q1 and Q2 are provided. Also a description was given above taking, as an example, a case in which the circuit device is a motor driver that drives the motor 100, but the object being driven by the circuit device of the present embodiment is not limited to being the motor 100, and various elements and devices having an inductor (coil) can be used as the object being driven.

Figure 4:
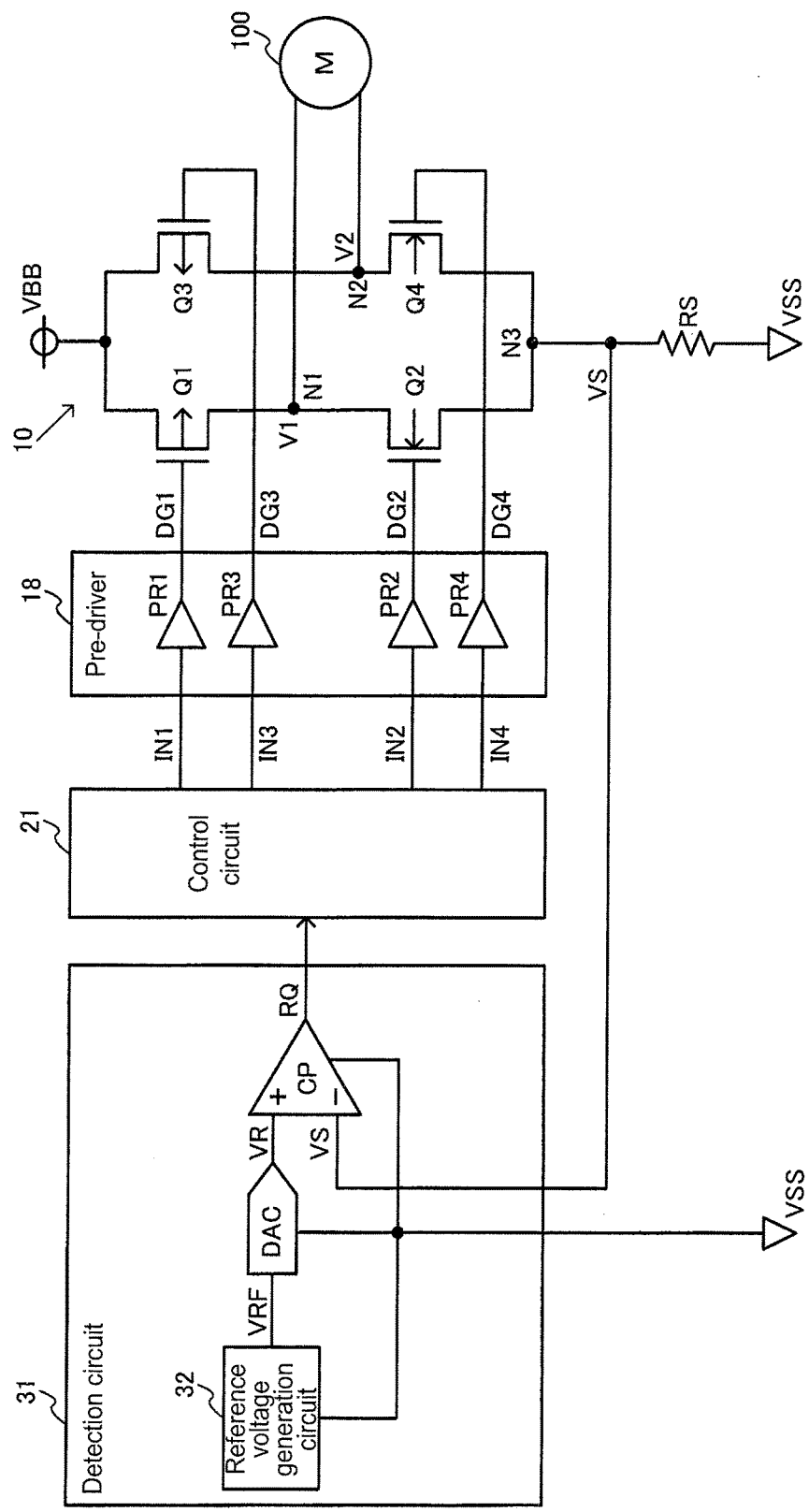
FIG. 4 shows an example of a configuration of a circuit device according to a comparative example of an embodiment.

FIG. 4 shows a circuit device according to a comparative example of the present embodiment. In the comparative example shown in FIG. 4, a sense resistor RS is provided between the low-potential side power supply VSS (GND) and a node N3 to which the sources of the low-side transistors Q2 and Q4 of the bridge circuit 10 are connected. That is to say, one end of the sense resistor RS is connected to the node N3, and the other end is connected to the node of the power supply VSS. Specifically, the node N3 of the bridge circuit 10 is connected to one end of the sense resistor RS, which is an external part, via the terminal (pad) (not shown) of the circuit device.

Also, a detection circuit 31 detects the charge current in the charge period by detecting the voltage VS of one end of the sense resistor RS. That is to say, the comparison circuit CP of the detection circuit 31 compares the reference voltage VR and the voltage VS, and if the voltage VS exceeds the reference voltage VR, the detection result signal RQ is made active. Thus, a control circuit 21 controls the switching on and off of the transistors Q1 to Q4 of the bridge circuit 10 so that switching from the charge period to the decay period is performed.

Here, for example, a resistor of about 1Ω is commonly used as the sense resistor RS. On the other hand, the on-resistance of the transistors Q1 and Q4 at the time when the charge current IC (on-current) flows in the transistors Q1 and Q4 during the charge period in FIG. 2A is, for example, about 1Ω. Accordingly, the sense resistor RS consumes around half of the power consumed by the transistors Q1 and Q4. For example, if the charge current IC is 500 mA to 1 A, a total of 1 W to 2 W of power will be consumed by the transistors Q1 and Q4, whereas 500 mW to 1 W of power will be consumed by the sense resistor RS. Accordingly, reduction of power consumption for the electronic apparatus or the like in which the circuit device is incorporated is hampered.

Also, a high-performance resistor with a high resistance accuracy, whose resistance varies little with respect to change in temperature, is used as the sense resistor RS. Accordingly, the sense resistor RS is commonly an external part of the circuit device. For example, the sense resistor RS is mounted as an external part on the circuit board on which the circuit device is mounted. For this reason, if the sense resistor RS is used, the number of parts in the electronic apparatus in which the circuit device is incorporated will increase. Also, when the sense resistor RS is mounted on the circuit board, the area in which it is mounted on the circuit board is solely occupied by the sense resistor RS. Also, the high-performance sense resistor RS incurs an increase in the cost of the electronic apparatus.

In view of this, in the present embodiment, a method is employed in which current flowing in the bridge circuit 10 is detected and switching from the charge period to the decay period is performed, without use of this type of sense resistor RS. For example, in FIG. 1, the on-current flowing in the transistor Q4 is detected, and switching from the charge period to the decay period is executed. Specifically, the on-current of the transistor Q4 is detected using the detection voltage V2, which is the drain voltage of the transistor Q4.

For example, if the temperature is constant, the on-resistance RON4 of the transistor Q4 will be constant (roughly constant), and therefore the detection voltage V2 will be proportionate to the on-current ION4 of the transistor Q4. Also, the on-current ION4 of the transistor Q4 corresponds to the charge current IC in FIG. 2A. Accordingly, by monitoring the detection voltage V2, it is possible to determine whether or not the charge current IC that corresponds to the on-current ION4 of the transistor Q4 has reached the chopping current ICP shown in FIG. 3. That is to say, if the detection voltage V2 exceeds the reference voltage VR, it is determined that the charge current IC has reached the chopping current ICP, and a switch from the charge period to the decay period is performed.

By doing so, it is possible to realize switching from the charge period to the decay period without use of the sense resistor RS shown in FIG. 4. Accordingly, since the power consumed by the sense resistor RS can be conserved, it is possible to achieve reduction of power consumption. Also, since the need for the sense resistor RS, which is an external part, is eliminated, it is possible to reduce the number of parts accordingly, and a reduction of the cost of the electronic apparatus can be achieved.

2. Temperature Compensation

Figure 5:
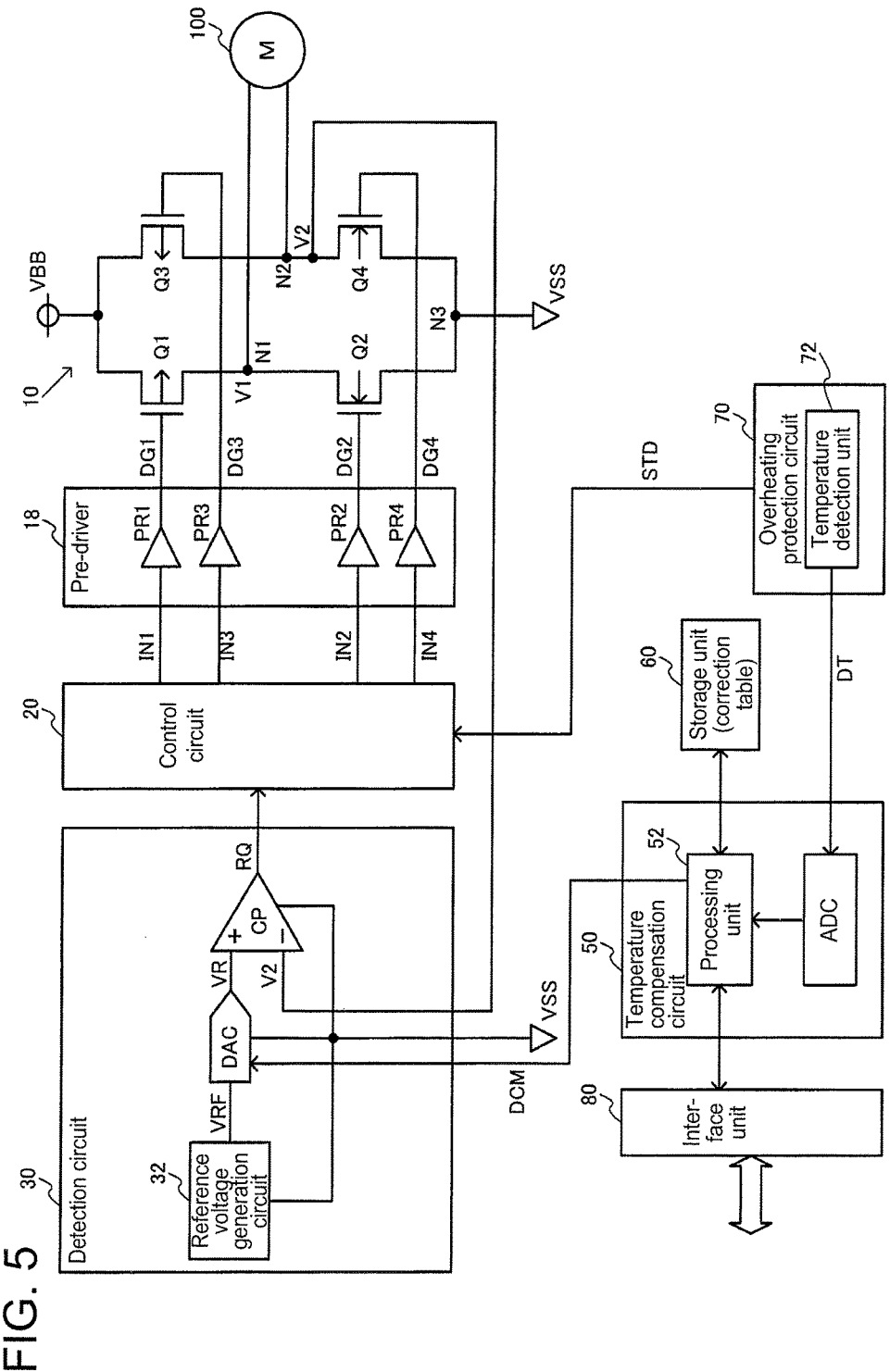
FIG. 5 shows a detailed example of a configuration of a circuit device according to an embodiment.

FIG. 5 shows a detailed example of the configuration of the circuit device according to the present embodiment. In the configuration example shown in FIG. 5, the temperature characteristic of the detection voltage V2 (first temperature characteristic) is compensated for (canceled out) by giving a temperature characteristic to the reference voltage VR that is to be input to the comparison circuit CP. Note that the circuit device according to the present embodiment is not limited to the configuration shown in FIG. 5 and is capable of being implemented with various modifications, such as removal of a portion of the constituent elements or addition of other constituent elements.

Figure 6:
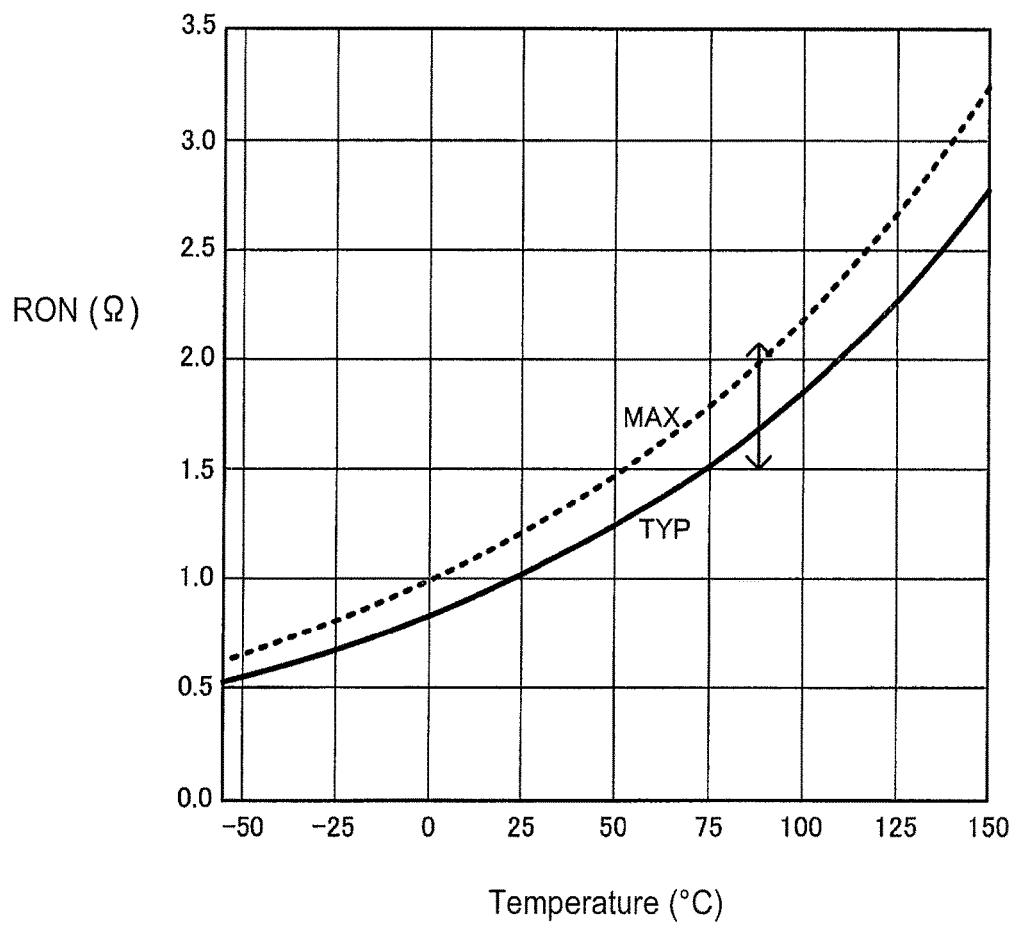
FIG. 6 shows an example of a temperature characteristic of on-resistance of a transistor.

For example, FIG. 6 shows the temperature characteristic of the on-resistance RON of a transistor. As shown in FIG. 6, the on-resistance RON of a transistor has a positive temperature characteristic. Accordingly, when the bridge circuit 10 itself generates heat due to the driving of the motor 100, accompanying the heat generation, the on-resistance RON of the transistors of the bridge circuit 10 also increases. Accordingly, in the charge period shown in FIG. 2A, the on-resistance RON4 of the transistor Q4 in which the charge current IC (on-current) flows increases, and the detection voltage V2 also increases as a result. Accordingly, if nothing is done about this, there is a risk that a suitable comparing operation can no longer be executed by the comparison circuit CP of the detection circuit 30.

In view of this, in FIG. 5, a temperature compensation circuit 50 is provided which sets the temperature characteristic of the reference voltage VR. For example, the temperature compensation circuit 50 sets the temperature characteristic of the reference voltage VR to a second temperature characteristic that compensates for the first temperature characteristic of the detection voltage V2. Specifically, the temperature compensation circuit 50 sets the temperature characteristic of the reference voltage VR to the second temperature characteristic based on a temperature detection result (DT) from a temperature detection unit 72. By doing so, if the on-resistance of the transistor Q4 changes and the detection voltage V2 changes due to the temperature changing, it is possible to change the reference voltage VR so as to compensate for the change in the detection voltage V2. Accordingly, a suitable comparing operation can be executed by the comparison circuit CP of the detection circuit 30, and the chopping current ICP shown in FIG. 3 can be suitably detected.

For example, in the present embodiment, a D/A conversion circuit DAC is provided in order to variably set the chopping current ICP that is to be used in the determination of switching from the charge period to the decay period, which was described using FIG. 3. The temperature compensation circuit 50 sets the temperature characteristic of the reference voltage VR, which is the voltage output from the D/A conversion circuit DAC according to the setting of the D/A conversion circuit DAC, to the second temperature characteristic. For example, the temperature compensation circuit 50 sets the D/A conversion circuit DAC (D/A conversion circuit for output correction) so that the reference voltage VR, which is the output voltage of the D/A conversion circuit DAC, changes by a given rate of change (see later-described FIG. 10 and the like) according to the temperature. Then, the detection circuit 30 compares the detection voltage V2 having the first temperature characteristic and the reference voltage VR having the second temperature characteristic and outputs the detection result (RQ).

For example, in FIG. 5, an overheating protection circuit 70 (thermal shutdown circuit) is provided in the circuit device. The overheating protection circuit 70 has the temperature detection unit 72 and performs an overheating protection operation. For example, if it is determined that a set temperature (e.g., 175 degrees) of the overheating protection operation has been reached based on the temperature detection result of the temperature detection unit 72, the overheating protection circuit 70 outputs a shutdown signal STD to the control circuit 20. Then, for example, upon receiving the shutdown signal STD, the control circuit 20 performs control for switching off the transistors Q1 to Q4 of the bridge circuit 10, shuts down the bridge circuit 10, and thereby overheating protection is realized. By doing so, if the bridge circuit 10 or the like generates an abnormally large amount of heat due to some circumstance, the bridge circuit 10 can be shut down appropriately.

Also, in FIG. 5, the temperature compensation circuit 50 sets the temperature characteristic of the reference voltage VR to the second temperature characteristic based on the temperature detection result from the temperature detection unit 72 of the overheating protection circuit 70. For example, as the temperature detection result, the temperature detection unit 72 outputs a temperature detection voltage DT having a third temperature characteristic. For example, a temperature detection voltage DT having a negative third temperature characteristic, such as that shown in FIG. 8, which will be described later, is output. Then, based on the temperature detection voltage having the third temperature characteristic, the temperature compensation circuit 50 performs correction processing for setting the temperature characteristic of the reference voltage VR to the second temperature characteristic. For example, correction processing for converting the third temperature characteristic into the second temperature characteristic based on correction data (a correction table) in a storage unit 60 is performed. For example, the temperature characteristic of the reference voltage VR is set to the second temperature characteristic by performing processing for converting the third temperature characteristic, which is a negative temperature characteristic, into the second temperature characteristic, which is a positive temperature characteristic.

Specifically, the storage unit 60 shown in FIG. 5 stores correction data (a correction table) for setting the temperature characteristic of the reference voltage VR to the second temperature characteristic. The correction data can be written in the storage unit 60 from the exterior via an interface unit 80, for example. Also, based on the correction data (correction table) in the storage unit 60 and the temperature detection voltage DT having the third temperature characteristic, the temperature compensation circuit 50 performs correction processing for setting the reference voltage VR to the second temperature characteristic. Here, the storage unit 60 can be realized using non-volatile memory such as OTP (One Time Programmable read-only memory), for example. Note that it is possible to realize the storage unit 60 using non-volatile memory other than OTP (such as EPROM, etc.), or it may be realized using a fuse circuit or the like.

For example, the temperature compensation circuit 50 has a processing unit 52 and an A/D conversion circuit ADC. The A/D conversion circuit ADC performs A/D conversion on the temperature detection voltage DT from the temperature detection unit 72 so as to convert it into digital temperature detection data. Then, the processing unit 52 sets the temperature characteristic of the reference voltage VR to the second temperature characteristic based on the digital temperature detection data and the correction data from the storage unit 60. Specifically, based on adjustment data DCM, the output voltage of the D/A conversion circuit DAC is set such that the temperature characteristic of the reference voltage VR becomes the second temperature characteristic.

Figure 7:
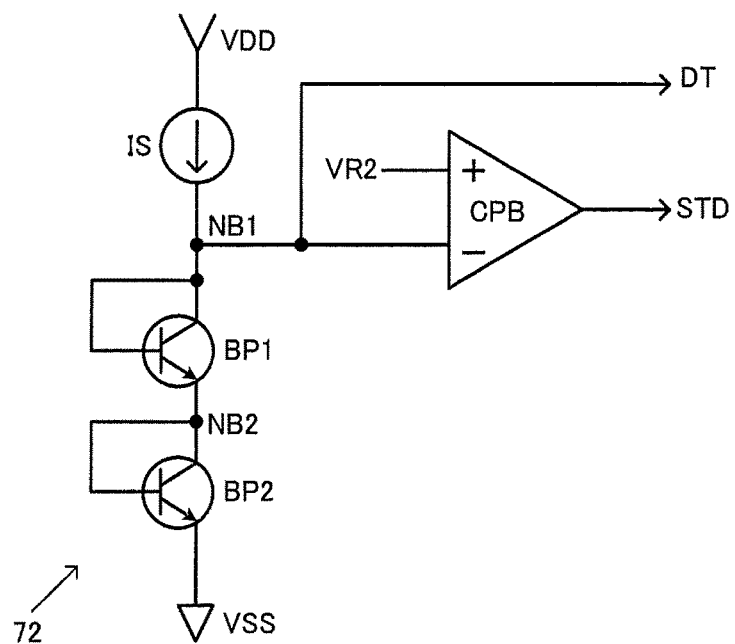
FIG. 7 shows an example of a configuration of an overheating protection circuit and a temperature detection unit.

FIG. 7 shows an example of the configuration of the overheating protection circuit 70. The overheating protection circuit 70 shown in FIG. 7 includes the temperature detection unit 72 and a comparison circuit CPB (comparator). The temperature detection unit 72 includes a current source IS (current source circuit) provided between the node of the high-potential side power supply VDD and the output node NB1 of the temperature detection unit 72, and includes bipolar transistors BP1 and BP2 that are provided in series between the output node NB1 and the node of the low-potential side power supply VSS. The bipolar transistors BP1 and BP2 are each diode-connected, that is, their bases are connected with their collectors.

Figure 8:
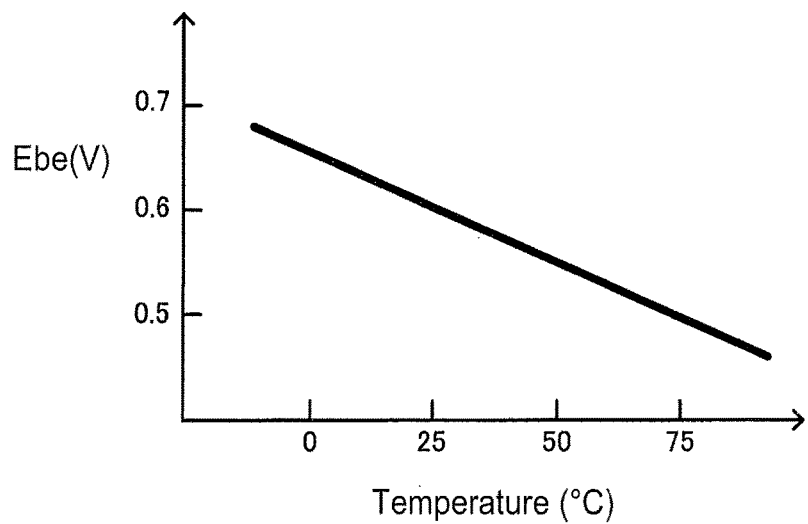
FIG. 8 shows an example of a temperature characteristic of a temperature detection voltage.

FIG. 8 shows an example of the temperature characteristic of a voltage Ebe between the base and emitter of each bipolar transistor, obtained by diode-connecting the bipolar transistors BP1 and BP2. This temperature characteristic corresponds to the third temperature characteristic of the temperature detection unit 72 and is a negative temperature characteristic. For example, letting Ebe1 and Ebe2 be the voltages between the bases and emitters of the respective bipolar transistors BP1 and BP2, the relationship is expressed as Ebe1=Ebe2=Ebe. Accordingly, the temperature detection voltage DT is DT=Ebe1+Ebe2=2×Ebe.

The comparison circuit CPB compares the temperature detection voltage DT with the reference voltage VR2. For example, a first input terminal (inverting input terminal) of the comparison circuit CPB receives input of the temperature detection voltage DT, and a second input terminal (non-inverting input terminal) receives input of the reference voltage VR2. Then, if the temperature increases and the temperature detection voltage DT is less than the reference voltage VR2, the comparison circuit CPB sets the shutdown signal STD to active (e.g., to a high level). When the shutdown signal STD becomes active, the control circuit 20 executes a shutdown operation for switching all of the transistors Q1 to Q4 in the bridge circuit 10 off.

For example, it is assumed that the set temperature for overheating detection in the overheating protection circuit 70 is 175 degrees, and the voltage Ebe between the base and emitter is 0.3 V when the temperature is 175 degrees. In this case, the reference voltage is set to VR2=0.6 V, for example. Also, if the temperature is less than 175 degrees, temperature detection voltage DT=2×Ebe is greater than reference voltage VR2=0.6 V, and therefore the shutdown signal STD output by the comparison circuit CPB becomes inactive (e.g., low-level). Also, if the temperature exceeds 175 degrees, the detection voltage DT, which is equal to 2×Ebe and has a negative temperature characteristic will be less than the reference voltage VR2, which is 0.6 V, and therefore the shutdown signal STD output by the comparison circuit CPB will become active, and the shutdown operation for overheating protection will be executed.

Next, the temperature compensation method of the present embodiment will be described in detail. FIGS. 9 and 10 show examples of the correction table (correction data) stored in the storage unit 60.

Variation between samples is present in the on-resistance of the transistor in the bridge circuit 10. In view of this, the correction table shown in FIG. 9 is used to perform correction processing for reducing (absorbing) the influence of the variation in the on-resistance.

Specifically, the DAC is set to match the on-resistance RON at a temperature of 25 degrees at the time of a shipping inspection. As described above, in the present embodiment, the setting value of the chopping current ICP shown in FIG. 3 can be variably set according to the setting of the D/A conversion circuit DAC. For example, in FIG. 9, the setting value of the chopping current ICP can be variably set to 50 mA, 100 mA, . . . , 700 mA, and 750 mA according to the DAC setting. Specifically, for example, the D/A conversion circuit DAC receives input of 4-bit setting data for setting the chopping current ICP. Also, if the setting data is 0001, a reference voltage VR for setting the chopping current ICP to 50 mA is output, if the setting data is 0010, a reference voltage VR for setting the chopping current ICP to 100 mA is output, . . . and if the setting data is 1111, a reference voltage VR for setting the chopping current ICP to 750 mA is output.

Also, for example, a case is envisioned in which it is detected that the on-resistance RON, which is normally 1Ω (typical value) when the temperature is 25 degrees, is 0.8Ω during the shipping inspection of the product. In this case, as indicated by A1 in FIG. 9, when it is assumed that the on-resistance RON is 0.8Ω, the D/A conversion circuit DAC is set so that the 50-mA, 100-mA, . . . , 700-mA, and 750-mA chopping currents ICP can each be detected suitably.

For example, it is assumed that the setting value for the chopping current ICP is 100 mA. Accordingly, if the temperature is 25 degrees, it is thought that when the 100-mA chopping current ICP flows in the transistor Q4, the detection voltage V2 will be 100 mA×0.8Ω32 0.080 V. In other words, since the on-resistance of the transistor Q4 has been detected as being 0.8Ω at the time of product shipping as described above, the detection voltage V2, which is the drain voltage of the transistor Q4, is 100 mA×0.8Ω=0.080 V. Accordingly, in this case, as indicated by A1 in FIG. 9, the D/A conversion circuit DAC outputs the reference voltage VR according to which VR=0.080 V. This makes it possible to appropriately switch from the charge period to the decay period when the chopping current ICP reaches 100 mA.

Also, for example, it is assumed that the setting value for the chopping current ICP is 700 mA. Accordingly, if the temperature is 25 degrees, it is thought that when the 700 mA chopping current ICP flows in the transistor Q4, the detection voltage V2 will be 700 mA×0.8Ω=0.560 V. Accordingly, in this case, as indicated by A1 in FIG. 9, the D/A conversion circuit DAC outputs the reference voltage VR according to which VR=0.560 V. This makes it possible to appropriately switch from the charge period to the decay period when the chopping current ICP reaches 700 mA.

FIG. 10 shows an example of a correction table with respect to temperature change during motor driving. The correction table stores correction data obtained by calculating the change rate of the on-resistance with respect to temperature variation, with 25 degrees used as a reference, for example.

For example, as indicated by B1 in FIG. 10, it is assumed that the temperature detection voltage is DT=1.288 V when the temperature is 25 degrees. Also, the reference voltages VR corresponding to the chopping currents ICP=50 mA, 100 mA, . . . , 700 mA, and 750 mA are initial values I050, I100, . . . , I700, and I750. The initial values I050, I100, . . . , I700, and I750 are set to the reference voltages VR in cases where RON=0.8Ω, as indicated by A1 in FIG. 9. Also, in the correction table shown in FIG. 10, the change rates of the on-resistance (reference voltage VR) with respect to the initial values I050, I100, . . . , I700, and I750 are stored as correction data.

For example, as indicated by B2 in FIG. 10, if the temperature detection voltage is DT=1.391 V and the temperature is detected as being 0 degrees, the change rate of the on-resistance is calculated as being 85.5%. Accordingly, the D/A conversion circuit DAC is set such that the reference voltage VR is 85.5% of the initial values I050, I100, . . . , I700, and I750.

On the other hand, as indicated by B3 in FIG. 10, if the temperature detection voltage is DT=0.977 V and the temperature is detected as being 100 degrees, the change rate of the on-resistance is calculated as being 158.6%. Accordingly, the D/A conversion circuit DAC is set such that the reference voltage VR is 158.6% of the initial values I050, I100, . . . , I700, and I750.

This makes it possible to suitably perform temperature compensation regarding variation in the on-resistance of the transistor Q4 with respect to the temperature variation.

Note that the setting of the D/A conversion circuit DAC by means of the correction table shown in FIGS. 9 and 10 can be realized as follows, for example. For example, a first D/A conversion circuit (main D/A conversion circuit) and a second D/A conversion circuit (correction D/A conversion circuit) are provided as the D/A conversion circuit DAC. Based on the setting data for the chopping current (e.g., 4-bit data), the first D/A conversion circuit outputs a reference voltage VR' that corresponds to the set chopping current (50 mA, 100 mA, . . . , 700 mA, 750 mA). On the other hand, based on the correction data (correction table) stored in the storage unit 60, the second D/A conversion circuit performs correction of the reference voltage VR' output by the first D/A conversion circuit and outputs the corrected voltage as the reference voltage VR. The correction in this case can be realized based on the change rate stored in the correction table shown in FIG. 10.

For example, if DT=1.391 V and the temperature is 0 degrees, correction is performed such that the reference voltage VR is a voltage obtained by multiplying the change rate indicated by B2 in FIG. 10 (85.5%) by a voltage set in A1 in FIG. 9 (0.040 V, 0.080 V, . . . , 0.560 V, or 0.600 V). Also, if DT=0.977 V and the temperature is 100 degrees, correction is performed such that the reference voltage VR is a voltage obtained by multiplying the change rate shown in B3 in FIG. 10 (158.6%) by a voltage set in A1 in FIG. 9 (0.040 V, 0.080 V, . . . , 0.560 V, or 0.600 V). The correction can be realized using a ladder resistor circuit (second D/A conversion circuit) or the like which uses a resistor to divide the reference voltage VR' output by the first D/A conversion circuit, for example.

3. Modified Example

Figure 11:
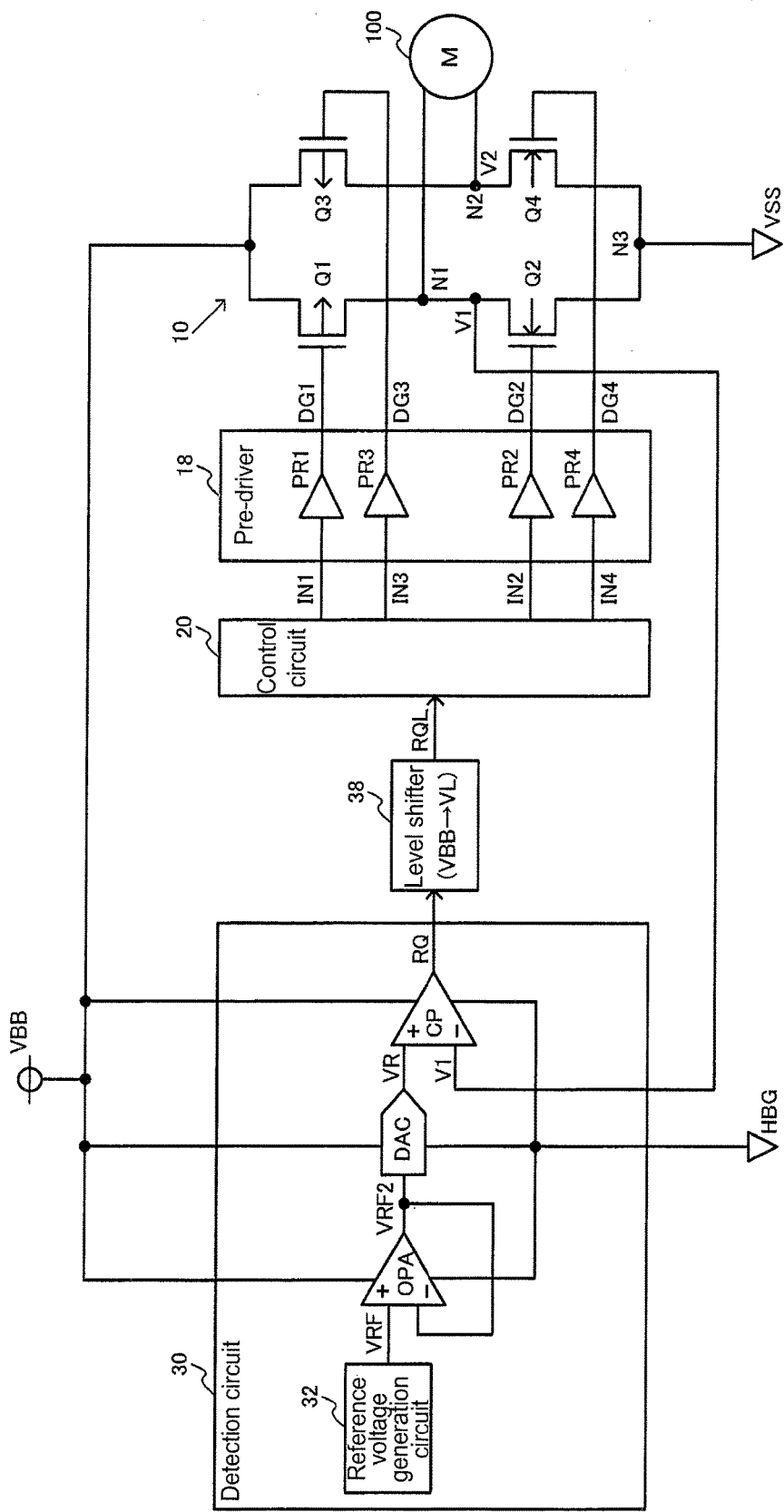
FIG. 11 shows a modified example of a circuit device according to an embodiment.

FIG. 11 shows a modified example of a circuit device according to the present embodiment. In FIG. 1, using the drain voltage of the low-side transistor Q4 as the detection voltage V2, the detection circuit 30 compared the detection voltage V2 and the reference voltage VR and output the detection result. In contrast, in the modified example shown in FIG. 11, using the drain voltage of the high-side transistor Q1 as the detection voltage V1, the detection circuit 30 compares the detection voltage V1 and the reference voltage VR and outputs the detection result. That is to say, in the modified example shown in FIG. 11, the drain-source voltage of the high-side transistor Q1 is detected and switching from the charge period to the decay period is executed.

For example, in FIG. 11, the detection circuit 30 includes a reference voltage generation circuit 32, an operational amplifier OPA, a D/A conversion circuit DAC, and a comparison circuit CP. Also, the high-potential side power supply VBB is supplied to the operational amplifier OPA, the D/A conversion circuit DAC, the comparison circuit CP, and the bridge circuit 10 as well. Furthermore, a high-side GND bias voltage HBG is supplied to the operational amplifier OPA, the D/A conversion circuit DAC, and the comparison circuit CP. In other words, these circuits operate using the bias voltage HBG as the low-potential side power supply. For example, if VBB=42 V, the bias voltage HBG is set to 37 V, for example. By doing so, the operational amplifier OPA, the D/A conversion circuit DAC, and the comparison circuit CP operate using VBB=42 V as the high-potential side power supply and HBG=37 V as the low-potential side power supply.

The operational amplifier OPA is connected as a voltage follower whose first input terminal (non-inverting terminal) receives input of the reference voltage VR from the reference voltage generation circuit 32 and whose second input terminal (inverting terminal) receives input of the output from the operational amplifier OPA. Accordingly, the reference voltage VR is converted into the reference voltage VRF2 that uses HBG as the low-potential side power supply voltage, and is input to the D/A conversion circuit DAC. Then, the D/A conversion circuit DAC outputs the reference voltage VR that uses HBG as the low-potential side power supply voltage, and the comparison circuit CP performs a comparison operation on the reference voltage VR and the detection voltage V1 and outputs the comparison result signal RQ to a level shifter 38.

For example, the level shifter 38 performs an operation of shifting the level of the detection result signal RQ having a voltage falling within a range of HBG=37 V to VBB=42 V, and outputs the detection result signal RQL having a voltage falling within a range of 0 V to 5 V to the control circuit 20. The control circuit 20 controls the switching on and off of the transistors Q1 to Q4 of the bridge circuit 10 based on the detection result signal RQL.

For example, the comparison circuit CP operates using VBB as the high-potential side power supply and HBG as the low-potential side power supply. The comparison circuit CP receives input of the reference voltage VR that uses HBG as the low-potential side power supply voltage, and compares the reference voltage VR and the detection voltage V1. On the other hand, the high-potential side power supply VBB is supplied to the source of the high-side transistor Q1, and the detection voltage V1 that is input to the comparison circuit CP is the drain voltage of the transistor Q1. Accordingly, with the modified example shown in FIG. 11, the voltage between the drain and source of the high-side transistor Q1 is monitored, and if the charge current, which is the on-current of the transistor Q1, reaches the chopping current, a circuit operation of switching from the charge period to the decay period is possible.

4. Electronic Apparatus

Figure 12:
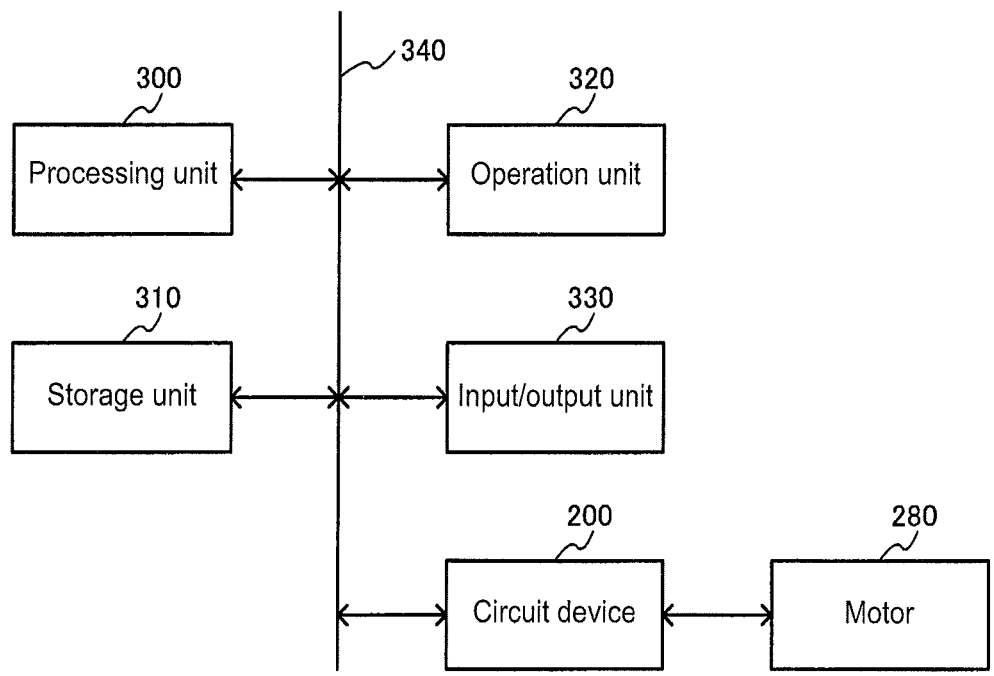
FIG. 12 shows an example of a configuration of an electronic apparatus.

FIG. 12 shows an example of a configuration of an electronic apparatus according to the present embodiment, in which a circuit device 200 (motor driver) has been applied. The electronic apparatus includes a processing unit 300, a storage unit 310, an operation unit 320, an input/output unit 330, the circuit device 200, a bus 340 that connects the units, and a motor 280. Hereinafter, a description will be given taking, as an example, a printer that uses motor driving to control a head and paper feeding, but the present embodiment is not limited thereto, and the invention can be applied to various types of electronic apparatuses.

The input/output unit 330 is constituted by an interface such as a USB connector or a wireless LAN and receives input of image data and document data, for example. The input data is stored in the storage unit 310, which is an internal storage device such as a DRAM, for example. Upon receiving a print instruction from the operation unit 320, the processing unit 300 starts an operation of printing the data stored in the storage unit 310. The processing unit 300 sends instructions to the circuit device 200 (motor driver) in accordance with the print layout of the data, and the circuit device 200 performs head movement and paper feeding by causing the motor 280 to rotate based on the instructions.

Note that although the present embodiment has been described above in detail, it should be apparent to a person skilled in the art that various modifications that do not stray substantially from the novelty and effects of the invention are possible. Accordingly, these modifications are all intended to be encompassed in the scope of the invention. For example, in the specification and the drawings, terms written together with different terms having wider interpretations or the same meaning in at least one instance can be replaced with those different terms in all cases in the specification or the drawings. Also, all combinations of the present embodiment and the modified examples are also included in the scope of the invention. Furthermore, the configuration, operation, and temperature compensation method of the circuit device also are not limited to the description of the present embodiment, and various modifications can be implemented.

What is claimed is:

1. A circuit device comprising:
   a bridge circuit including a high-side transistor and a low-side transistor;
   a detection circuit configured to:
      compare:
         a detection voltage of the bridge circuit, set using an on-current and an on-resistance of at least one of the low-side transistor and the high-side transistor, and
         a reference voltage of the bridge circuit, having a second temperature characteristic that compensates for a first temperature characteristic of the detection voltage; and
      output a detection result; and
   a control circuit including a temperature compensation circuit configured to:
      set the second temperature characteristic based on a temperature detection voltage from a temperature detection unit, the temperature detection voltage having a third temperature characteristic, and
      perform correction processing for setting the second temperature characteristic based on the temperature detection voltage,
   the control circuit being configured to control switching on and off of the high-side transistor and the low-side transistor and configured to perform switching from a charge period to a decay period based on the detection result output from the detection circuit.

2. The circuit device according to claim 1, further comprising:
   an overheating protection circuit that includes the temperature detection unit and is configured to perform an overheating protection operation.

3. The circuit device according to claim 1, wherein
   the detection circuit includes a D/A conversion circuit for variably setting a chopping current to be used in determination of switching from the charge period to the decay period, and
   the second temperature characteristic is a voltage output from the D/A conversion circuit according to the setting of the D/A conversion circuit.

4. The circuit device according to claim 1, further comprising:
   a storage unit configured to store correction data for setting the second temperature characteristic of the reference voltage to the second temperature characteristic.

5. The circuit device according to claim 1, wherein the first temperature characteristic and the second temperature characteristic are positive temperature characteristics.

6. The circuit device according to claim 1, wherein the detection voltage is a drain voltage of the low-side transistor.

7. The circuit device according to claim 1, wherein the detection voltage is a drain voltage of the high-side transistor.

8. The circuit device according to claim 1, wherein
   if the detection voltage exceeds the reference voltage, the control circuit controls switching on and off of the high-side transistor and the low-side transistor so that switching from the charge period to the decay period is performed.

9. An electronic apparatus configured to include the circuit device according to claim 1.

10. A circuit for controlling driving of a motor, comprising:
    a bridge circuit including a first high-side transistor and a first low-side transistor connected together at a first node, a second high-side transistor and a second low-side transistor connected together at a second node, the first node and the second node for connecting to first and second terminals of the motor, and the bridge circuit outputting a detection voltage;

a detection circuit configured to:
  generate a reference voltage of the bridge circuit;
  compare:
    a detection voltage of the bridge circuit, the detection voltage having a first temperature characteristic, and
    the reference voltage that has a second temperature characteristic that compensates for the first temperature characteristic; and
  output a detection result; and a control circuit including a temperature compensation circuit configured to:
  set the second temperature characteristic based on a temperature detection voltage from a temperature detection unit, the temperature detection voltage having a third temperature characteristic, and
  perform correction processing for setting the second temperature characteristic based on the temperature detection voltage, the control circuit being configured to control switching on and off of the first and second high-side transistors and the first and second low-side transistors, and configured to perform switching from a charge period to a decay period based on the detection result output from the detection circuit.

11. The circuit of claim 10, wherein the temperature compensation circuit causes variation of the reference voltage based on a detected temperature.

12. The circuit device according to claim 10, further comprising an overheating protection circuit that is configured to perform an overheating protection operation, so that if a detected temperature exceeds a threshold temperature, the overheating protection circuit directs an overheat protection signal to the control circuit, and in response, the control circuit switches off the first and second high side transistors and the first and second low side transistors.

13. The circuit device according to claim 10, wherein if the detection voltage exceeds the reference voltage, the control circuit controls switching on and off of the high-side transistor and the low-side transistor so that switching from the charge period to the decay period is performed.

14. An electronic apparatus configured to include the circuit device according to claim 10.

* * * * *